United States Patent [19]

Strobel et al.

[11] Patent Number: 5,755,135
[45] Date of Patent: May 26, 1998

[54] PROCESS FOR PRESSING A SCANNING DEVICE AGAINST A FIBER SLIVER IN A SLIVER GUIDE AND DEVICE FOR ITS PRODUCTION

[75] Inventors: Michael Maria Strobel, Eichstätt; Gerd Münnekehoff, Remscheid, both of Germany

[73] Assignee: Rieter Ingolstadt Spinnereimaschinenbau AG, Ingolstadt, Germany

[21] Appl. No.: 441,481

[22] Filed: May 15, 1995

[30] Foreign Application Priority Data

Jan. 5, 1995 [DE] Germany ............... 195 00 189.3

[51] Int. Cl.⁶ .................... G01B 7/06; G01B 11/06
[52] U.S. Cl. ................. 73/159; 73/160; 33/501.02
[58] Field of Search .................. 73/159, 160; 19/23, 19/24; 33/501.02, 501.03, 501.04

[56] References Cited

U.S. PATENT DOCUMENTS

| | | | |
|---|---|---|---|
| 2,871,519 | 2/1959 | Flint et al. | 19/24 |
| 3,435,673 | 4/1969 | Felix | 73/160 |
| 4,184,646 | 1/1980 | Seney | 73/160 X |
| 4,403,374 | 9/1983 | Wood . | |
| 4,601,134 | 7/1986 | Hessemann | 51/138 |
| 4,637,144 | 1/1987 | Schemel | 33/550 |
| 4,646,387 | 3/1987 | Oswald et al. | 19/23 |
| 4,956,970 | 9/1990 | Bauer et al. . | |
| 5,018,246 | 5/1991 | Leifeld . | |
| 5,123,280 | 6/1992 | Baechler . | |
| 5,233,727 | 8/1993 | Baechler . | |

FOREIGN PATENT DOCUMENTS

| | | |
|---|---|---|
| 0096742 | 12/1983 | European Pat. Off. . |
| 2850775 | 8/1979 | Germany . |
| 86113577 | 5/1989 | Germany . |
| 89129946 | 1/1990 | Germany . |
| 4037339 | 6/1991 | Germany . |
| 4119886 | 12/1992 | Germany . |
| 2001366 | 1/1979 | United Kingdom . |
| 2062704 | 5/1981 | United Kingdom . |
| 2277106 | 10/1994 | United Kingdom . |

OTHER PUBLICATIONS

Article, Melliand Textilberichte 65 (1984), 577–580.

Primary Examiner—William A. Cuchlinski, Jr.
Assistant Examiner—Willie Morris Worth
Attorney, Agent, or Firm—Dority & Manning

[57] ABSTRACT

A process and device for scanning a moving fiber sliver in a textile machine to measure the thickness of the sliver has a movably mounted scanning element which is pressed against the fiber sliver and has a contact pressure against the sliver. The degree of movement of the movable scanning element indicates changes in the thickness of the moving fiber sliver. An adjusting element is connected to the movably mounted scanning element and maintains a constant contact pressure of the scanning element against the sliver over the entire measuring range of the movable scanning element.

23 Claims, 5 Drawing Sheets

PROCESS FOR PRESSING A SCANNING DEVICE AGAINST A FIBER SLIVER IN A SLIVER GUIDE AND DEVICE FOR ITS PRODUCTION

BACKGROUND OF THE INVENTION

The instant invention relates to the process of pressing a scanning device against a fiber sliver in a sliver guide such as is used to measure the thickness of fiber slivers on a textile machine. Such a textile machine may be a carder, a draw frame, a flyer or a spinning machine. The pressing of the scanning device is important for the constitution of a correct measuring signal indicating the thickness of the fiber sliver. The measuring signal indicating the thickness is important to control other processes on the textile machine.

In order to ascertain the thickness of a fiber sliver, the fiber sliver is taken over a sliver guide which is fixedly installed. Such a sliver guide may be a scanning roller fixed by its rotational axle, a rod, a sliver guiding channel or a sliver funnel. The fiber sliver has contact with the sliver guide and is guided through same. A scanning device is pressed on the fiber sliver being guided in the sliver guide. The pressure is effected by a spring which is under tension and is connected to the scanning device. The scanning device is mounted movably, i.e. the scanning device moves at a distance from the sliver guide that is a function of the thickness of the conveyed fiber sliver. The scanning device can execute a swivelling or a lifting movement in this process.

The scanning device is assigned to a signal converter which detects the movement of the scanning device and converts them into an electric measuring signal. The scanning device may be a movable scanning roller for example. The movable scanning roller is pressed on the fixed scanning roller. The movable scanning roller can be mounted on a swivel arm or a lifting arm. A spring attaches at the swivel arm or at the lifting arm and makes the pressure possible.

A scanning device must also be understood to be a scanning element having schematically the form of a finger. This scanning element extends towards the sliver guide in the direction of conveying. The part of the scanning element touching the fiber sliver is made in the form of a gliding surface. The scanning device is movable vertically and at a right angle in relation to the direction of movement of the fiber sliver. Since the scanning device is made in the form of a lever arm, it is pressed by means of a spring in the direction of a fixed gliding surface of a sliver guiding channel or of a sliver funnel. The sliver guiding channel or sliver funnel are sliver guides. Through the movement of the scanning device the thickness of the fiber sliver is ascertained. A connected signal converter converts the magnitude of the movement into an equivalent electrical signal.

The fiber sliver is understood to be a fiber fleece, a fiber sliver made up of several doubled bands, or a drafted fiber sliver.

The disadvantages when a scanning device is pressed against a fiber sliver in a sliver guide are explained below on the basis of a pair of scanning rollers. These disadvantages when a pair of scanning rollers is pressed against a sliver also apply to the pressing against a scanning device.

The design, utilization and operation of such a pair of scanning rollers is described in detail in the instruction manual for draw frame RSB 851 (4135), SB 851 (4131) of the RIETER Spinning Systems of August 1990. Under section 4.5.1. the adjustment of the scanning roller load is described for a scanning roller installed before the entrance to a set of drawing equipment. The fixed scanning roller is mounted rotatably and has a radial groove on the circumference. The fiber sliver to be measured is conveyed in this groove. The movable scanning roller is mounted by its rotational axle in a swivel arm, whereby the swivel arm can swivel around its rotational axis. The swivel arm swivels in accordance with an arc of circle. The movable scanning roller has a ring, radially on the circumference. Since the movable scanning roller is installed in a swivel arm, the movable scanning roller is pressed upon the fixed scanning roller by means of a spring which attaches at the swivel arm. The ring of the movable scanning roller presses into the groove of the fixed scanning roller and presses the fiber sliver to be measured as a result of the spring load. The pair of scanning rollers is driven by a drive by means of force transmission means. The two scanning rollers rotate synchronously towards each other.

The fiber sliver is conveyed through the pair of scanning rollers and is transferred to the intake roller pair of the draw frame.

Scanning roller pairs in which the movable scanning roller executes a lifting movement relative to the fixed scanning roller are also known. Here too, the movable scanning roller is pressed against a fixed roller. The statements which follow concerning a pair of scanning rollers also apply for this form of design.

The axial distance between the axis of the fixed scanning roller and the axis of the movable scanning roller changes with the thickness of the fiber sliver. Due to the fluctuations in thickness of the fiber sliver, the corresponding fluctuating movements of the movable scanning roller are converted by a signal converter into an electrical signal. This electrical signal is transmitted to an electronic system which controls drafting of the fiber sliver in the drafting equipment.

The extent of the required pressure force for the movable scanning roller, which is realized by a tension spring, depends on the fiber material processed and on the intake speed. To set the desired pressure force, clips at different distances on the spring are used, so that each clip can be hooked in a different position into the swivel arm. The different clips represent different pressures. This changeover requires an assembly effort, whereby the draw frame must be stopped. It is also a disadvantage that the pressure can be adjusted only in steps, corresponding to the existing clips of the spring. The spring is an adjusting element which is adjusted only manually. Intermediate values cannot be set.

With the changing deflection of the movable scanning element, the traction of the spring also changes so that a different pressure is applied on the fiber sliver over the entire measuring range. A lack of linearity of the measuring signal over the measuring range of the scanning device is found, i.e. there is no direct linearity between thickness of the fiber sliver and deflection of the movable scanning element. This is an important shortcoming. It leads to the formation of erroneous measuring signals and finally to faulty drafting. This finding also applies to a sliver funnel used as a sliver guide, with a scanning element as the scanning device.

A sliver guide with scanning device can also be used downstream from the drafting equipment. In that case, the above-mentioned disadvantages apply equally. According to the operating manual mentioned above, this applies to the draw-off rollers (section 4.4.3, page 28 and section A4, page 86 ff). These draw-off rollers are used to measure the thickness of the fiber sliver after the drafting equipment. These draw-off rollers function similarly to the described pair of scanning rollers. The draw-off rollers supply a measuring signal to a sliver monitor which monitors the adherence to the sliver number.

OBJECTS AND SUMMARY OF THE INVENTION

It is a principal object of the instant invention to ensure linearity of the measuring signal for the entire measuring range of a scanning device of a sliver guide which is installed on a textile machine to measure the thickness of a fiber sliver and to reduce its cost for change-over when batches are changed.

Additional objects and advantages of the invention will be set forth in part in the following description, or may be obvious from the description, or may be learned through practice of the invention.

According to the present invention, when a scanning device is pressed against the fiber sliver in a sliver guide, the pressure force of the movable scanning elements is kept substantially constant over the entire measuring range of the scanning element by means of the adjusting element.

The adjusting element may be constituted by a cylinder chamber with piston of such dimension that it acts as a pneumatic or hydraulic volume storage. A pressure is set in the volume storage which acts via the connection between piston and scanning device, the pressure representing the desired pressure force applied to the movable scanning device, under deduction of appropriate resistance forces along this connection. The volume of the volume storage is sized so that the movements transmitted from the scanning device to the piston result merely in insignificant pressure changes in the volume storage. Due to the fact that insignificant pressure changes occur, it is possible to keep the pressure in the volume storage and thereby the pressure force against the movable scanning element at a substantially constant value over the entire measuring range.

The volume storage may be made advantageously in the form of a cylinder chamber with pressure compensating cylinder. The pressure equalization cylinder may also be made in the form of a defined length of hose with stretchable sides. The pressure equalization cylinder may also have a connection to a pressure generator. The pressure set and held in the volume storage is transmitted at the piston by means of force transmission devices (e.g. rod) to the scanning element. It must be taken into consideration here that the force with which the piston is pre-stressed unilaterally must be overcome. The pressure set and held in the volume storage is an equivalent of the pressure force of the movable scanning roller.

In another advantageous embodiment, the volume storage, i.e. the cylinder chamber and the pressure equalization cylinder, can be connected to a pressure reduction valve. The pressure reduction valve makes it possible for the desired value of the pressure in the volume storage, and thereby in the end the pressure force of the movable scanning roller, to be adjusted continuously. The connection of an adjustable pressure generator to the input of the pressure reduction valve sets the pressure in the volume storage. When the pre-set desired value is exceeded, the pressure reduction valve automatically deaerates the overpressure until the desired value is again reached. It is possible to use the adjustable pressure generator to control its own functioning. When the desired value is reached at the pressure reduction valve, the pressure generator can be stopped, so that the input pressure achieved at the pressure reduction valve is maintained. Through continuous modification of the desired value at the pressure reduction valve, values of the pressure force can be changed and adjusted continuously. This is especially advantageous when new values of the pressure force must be set as batches are changed, due to changing delivery speed or different fiber material. With the interruption of the input pressure going to the pressure reduction valve or during deaeration of the volume storage via the pressure reduction valve, the pressure of the volume storage can be reduced to such an extent that the piston is switched over from a pressure movement to a traction movement by the unilateral pre-stress of a compression spring. The traction force at the piston exerted upon the movable scanning element due to the unilateral pre-stress of the compression spring takes the scanning element from an operating position into an opening position. This taking of the scanning element into an opening position helps the operator, especially when batches are changed, to insert a new fiber sliver between the scanning element and the sliver guide. After insertion of the fiber sliver between scanning element and sliver guide, a switch-over to pressure force is effected automatically by increasing the pressure in the volume storage, so that the scanning element is also brought back from its opening position into its operating position.

If a mobile, external pressure generator is used, the input of the pressure reduction valve must be connected to a check valve.

According to another, advantageous embodiment, the adjusting element can be controlled. For this purpose, a pressure sensor which ascertains the current pressure and transmits it to controls is installed in the volume storage of the adjusting element. A control valve is controlled as a function of a desired pressure value which is entered in the control program. This control valve is connected to a pressure generator. In case of unwanted pressure increase in the adjusting element, this is recognized via the sensor and announced to the controls. The controls control the control valve in outflow direction and closes again when the desired value has been reached. If negative pressure is present in the adjusting element, the sensor signals this to the controls and the controls switch the control valve to allow passage for the generation of pressure while actuating the pressure generator at the same time. When the desired value of pressure in the adjusting element has been reached, the controls close the control valve so that the pressure is maintained in the setting element and the pressure generator is stopped.

With the program for such a control, it is possible to make a selection among a plurality of desired values, whereby the selection can be made in connection with a command input from an operator level by the machine operating personnel. In alternation between adjusting element, control valve, and pressure generator, the controls then automatically adjusts the desired pressure in the adjusting element as described earlier. As discussed earlier, this pressure corresponds to the desired contact pressure against the scanning element, under deduction of the unilateral pre-stress force of the piston. The scanning element can be brought automatically by means of this control from an operating position into an opening position.

In another embodiment, the adjusting element is constituted by an electrical cyclic magnet. As a rule, a gear is integrated on a cyclic magnet. The output of the gear is connected directly or via force transmission means to the scanning element. The cyclic magnet is used to provide a constant torque at very low rotational speed, or in a stopped state. This corresponds to its operating curve. It is thus possible to produce a constant torque for the entire measuring range of the scanning element ensuring a nearly constant contact pressure of the scanning element. This adjusting element would also be controllable. By changing the phase control in supplying voltage to the cyclic magnet, its rotational speed and thereby its torque can be adjusted to a desired value. This is the procedure when batches are changed. The direction of rotation can also be changed. This is useful when the movable scanning element would have to be brought away from the sliver guide into an opening position.

DETAILED DESCRIPTION OF THE PREFERRED EMBODIMENTS

Figure 1:
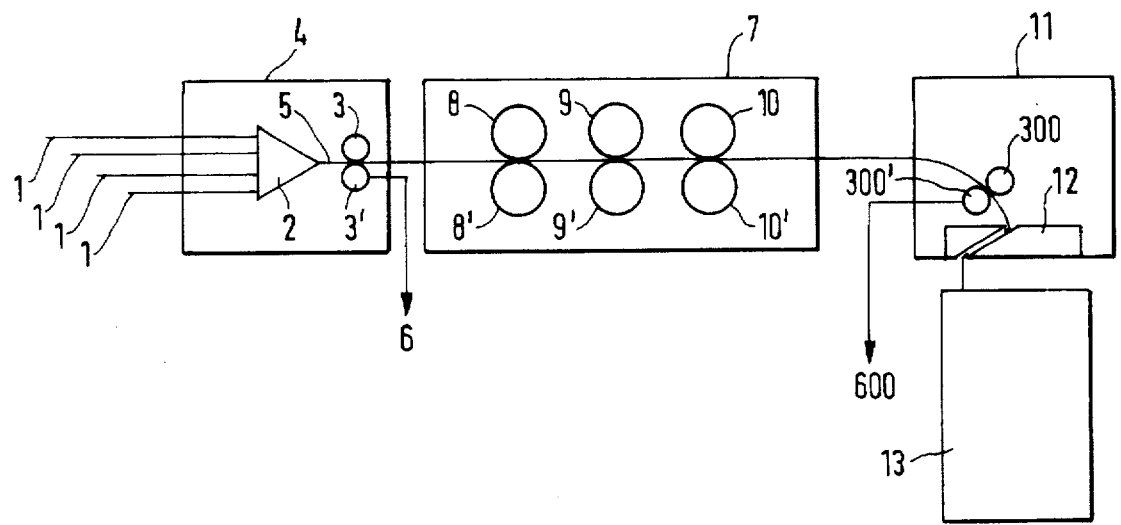
FIG. 1 shows points of utilization of a pair of scanning rollers on a conventional draw frame.

Reference will now be made in detail to the presently preferred embodiments of the invention, one or more examples of which are illustrated in the drawings. Each example is provided by way of explanation of the invention, and not meant as a limitation of the invention. For example, features illustrated or described as part of one embodiment can be used on another embodiment to yield still a further embodiment.

FIG. 1 schematically shows a draw-frame of the textile industry. The fiber slivers 1 drawn from cans are fed via an intake table 4 to a sliver funnel 2. This sliver funnel 2 doubles the fiber slivers into a fiber sliver 5. The fiber sliver 5 appearing at the opening of the sliver funnel 2 runs through a pair of scanning rollers 3,3'. This pair of scanning rollers 3,3' measures the thickness of the fiber sliver and, in association with a signal converter, produces a measuring signal indicating the sliver thickness. This measuring signal is made available to a regulating device in order to control the drafting of the fiber sliver 5 in the drafting equipment 7. This measuring signal 6 can, in addition, be transmitted also to additional devices of the signal processing system, for example serving to improve the drafting control. The fiber sliver 5 is transferred by the pair of scanning rollers 3,3' to the pair of intake rollers 8,8' of a drafting equipment 7. The drafting equipment 7 is furthermore provided with a pair of central rollers 9,9' and with a pair of delivery rollers 10,10'. The fiber sliver 5 is fed by the pair of delivery rollers 10,10' to a depositing device 11. This depositing device 11 contains known operating elements such as a fleece funnel, a sliver channel, a sliver funnel, and a pair of calendar rollers 300,300'. In the depositing device 11, the fiber sliver 5 runs through these operating elements which are not shown and is finally deposited by means of a rotary plate 12 in a can 13.

The pair of calendar rollers 300,300' has the task to measure the thickness of the fiber sliver at the output of the drafting equipment. The measuring function of the pair of calendar rollers 300,300' is analogous to that of the pair of scanning rollers 3,3'. The pair of calendar rollers 300,300' supplies a measuring signal 600 which may be delivered to a sliver monitor, for example. The sliver monitor may monitor the observance of the sliver number, for example.

Figure 2:
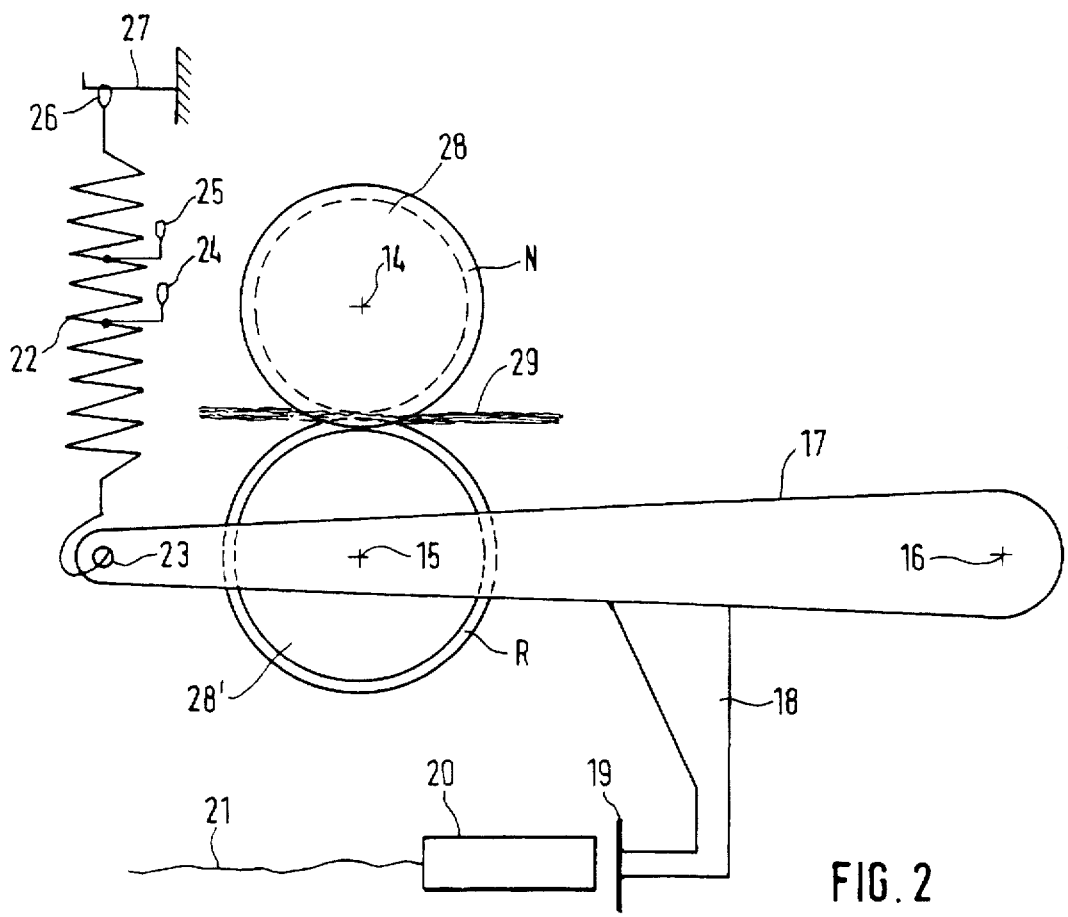
FIG. 2 shows the state of the art for the production of a contact pressure on the scanning roller pair.

FIG. 2 shows other details of the scanning roller pair as they are known in the state of the art. The pair of scanning rollers has a scanning roller 28 which is mounted rotatably on the rotation axle 14. The rotation axle 14 is fixed. The fixed scanning roller is a sliver guide. The counter-piece is the scanning roller 28'. The movable scanning roller 28' is a scanning element. The scanning roller 28' is mounted rotatably around rotation axle 15. The rotation axle 15 is located in a swivel arm 17. The swivel arm carries out the function of a movement device. The swivel arm 17 can be swivelled around the rotation axle 16. This mechanical arrangement similarly applies to the pair of calendar rollers 300,300'. An elbow arm 18 is mounted on the swivel arm 17 and supports a metallic target 19. Across from the target 19, a sensor 20 is installed in a fixed position and operates without contact. This sensor 20 has a signal circuit going to controls, which may be the controls of the drafting equipment or another signal evaluation for improvement of control. The fiber sliver 29 is clampingly held between the pair of scanning rollers 28, 28'. The scanning roller 28 is provided with a groove N in which the fiber sliver is guided and the scanning roller 28' is provided with a ring R which holds the fiber sliver 29 in the groove N. This geometry is advantageous for sliver guidance, but not necessary for the function of the invention. For example, the ring R and the groove N can be omitted in the pair of calendar rollers 300,300'. At the end of the swivel arm 17 is a bore 23 into which a spring 22 is engaged. This spring 22 is hooked at its spring end, made in the form of a bracket 26, in a fixed hook 27. The spring 22 is thus under tension and presses the scanning roller 28' against the fixed scanning roller 28, i.e. the ring R presses the fiber sliver into the groove N. Thick spots or thin spots in the fiber sliver 29 result in a swivelling motion of the swivel arm 17 and thereby to a swivelling motion of the scanning roller 28'. This also applies to the pair of calendar rollers 300,300', whereby the calendar roller 300' is the movable one. The swivelling motion is transmitted by the target 19 across from the fixed sensor 20 which functions as a proximity sensor. As a function of the swivelling motion of the scanning roller 28', the sensor 20 produces an electric signal which is equivalent to the fiber sliver thickness. In this known device, the disadvantage is that when greater disturbances occur in the fiber sliver thickness, a wider deflection of the scanning roller 28' results. With a wider deflection of the scanning roller 28' the spring tension changes however, and with it the contact pressure in a different order of magnitude than with a shorter deflection. This finding also applies to the pair of calendar rollers 300,300'. Therefore measuring signals which were produced under different contact pressure conditions are transmitted via the signal circuit 21. This is a faulty measurement.

In case of batch change, and for a different material of the fiber sliver or at a different delivery speed, a different value of the contact pressure is also required. For this purpose the spring 22 is provided with additional brackets 24, 25 so that either bracket 24 or 25 can be hooked into the fixed hook 27 in case of batch change. A new contact pressure of the spring, as a function of the process, is thus produced manually. This requires a manual change-over effort. The drafting equipment must be stopped for this. Furthermore, the disadvantage that no consistency in contact pressure is maintained over the entire measuring range of the pair of scanning rollers persists even after the batch change.

In the state of the art, the measuring of the fiber sliver thickness, e.g. on a draw frame, is not only known to be effected by means of pairs of scanning rollers. Measuring the fiber sliver thickness by means of a sliver funnel and a scanning element is also known. In this sense the sliver funnel could contain a scanning element and the pair of scanning rollers 3.3' as a measuring element could be omitted. Further details are explained in FIG. 2a.

Figure 2A:
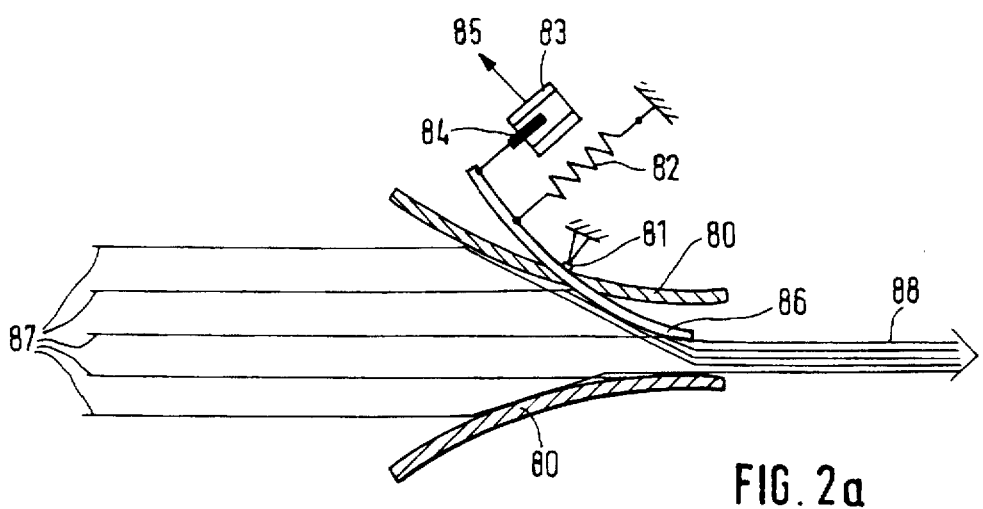
FIG. 2a shows the state of the art for the production of a contact pressure on the scanning element of a sliver funnel.

FIG. 2a shows the details of a sliver funnel with scanning element, such as they are known in the state of the art. In the same manner as the pair of scanning rollers, the sliver funnel with scanning element is a special design of a sliver guide with scanning device.

The sliver funnel 80 may be located before the drafting equipment of a draw frame, for example. Several fiber slivers 87 are doubled by the sliver funnel 80 and compressed into a fiber sliver 8. In a recess in one side of the funnel, a scanning element 86 is installed. The scanning element 86 is pivotably mounted in an axle 81. The lever of the scanning element 86 which is outside of the funnel 80 is connected to a spring 82 which puts the scanning element 86 under tension. The spring 82 presses the gliding surface of the scanning element 86, which is located inside the funnel 80, against the entering fiber sliver in the direction of the fixed sliver funnel side. The scanning element 86 may furthermore be connected to a plunger 84 which extends into an electric measuring element 83. The electric measuring element 83 may be a plunger coil for example. Because of varying fiber sliver thickness, the scanning element 86 is moved. The movement of the scanning element 86 leads to a movement of the plunger 84, so that the electric measuring element 83 produces an electric measuring signal 85. In the case of a wider deflection of the scanning element 86, the contact pressure through the spring attains different values than is the case with shorter deflections. The disadvantage that no consistency of contact pressure exists over the entire measuring range of the scanning element 86 persists. This is the analogous fault to that which was already described with respect to the pair of scanning rollers 28, 28'.

Figure 3:
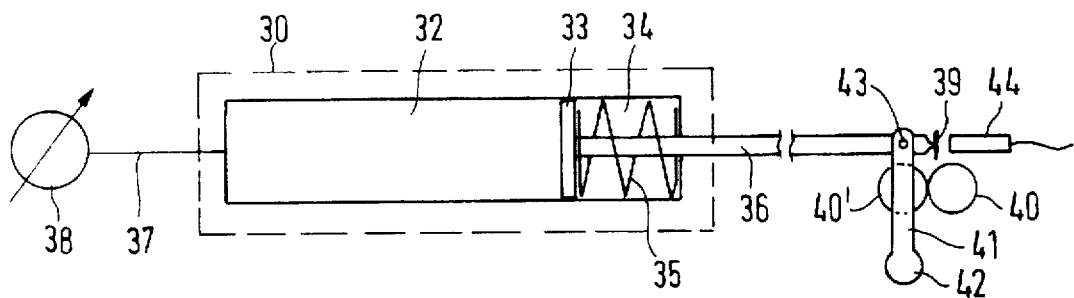
FIG. 3 shows an adjusting element in the form of a volume storage designed with a cylinder chamber.

FIG. 3 shows an embodiment according to the invention. The adjusting element 30 can be made in the form of a hydraulic or pneumatic volume storage. The volume storage consists of a cylinder chamber 32, 34 with piston 33. In the cylinder chamber 34, a compression spring 35 with known spring curve is installed. The force of the spring 35 is directed so that the piston 33 can be moved in the direction of the cylinder chamber 32. The piston 33 is connected to rod 36. The other end of rod 36 is connected to a swivel arm 41. The swivel arm 41 supports an axle 43 in which the rod 36 is movably mounted. At its end the rod 36 supports a target 39. Across from the target is a contact-less proximity sensor 44. The swivel arm 41 supports a movable scanning roller 40'. The swivel arm can swivel around the rotation axle 42.

The volume storage is connected by means of connection 37 to a controlled pressure generator 38 via the latter's connection circuit. The volume storage's expansion is sized so that all pressure changes in the cylinder chamber 32 produced via the connection scanning roller 40'—piston 33 are damped so that the pressure in the cylinder chamber 32 can be maintained at a substantially constant value.

In order to establish the operating readiness of the pair of scanning rollers 40, 40', the desired contact pressure of the movable scanning roller 40' must be adjusted. In this regard, it should be noted that the force of spring 35 must be overcome. For that purpose, compressed gas, for instance, is blown in at the connection 37 by means of the pressure generator 38. The connection 37 can therefore be connected directly to a central compressed-gas generator of a drafting equipment. The pressure generator 38 can be adjusted, so that pressure generation is stopped when the wanted gas pressure is reached in the cylinder chamber 32. The pressure existing in the cylinder chamber 32 is the value which is finally equivalent to the required contact pressure of the movable scanning roller 40'. The cylinder chamber 32 which is sized as a volume storage makes it possible for movements of the piston 33 to result in an insignificant change of the pressure in the cylinder chamber 32, so that the contact pressure of the movable scanning roller 40' over its entire measuring range can be maintained essentially constant.

Figure 4:
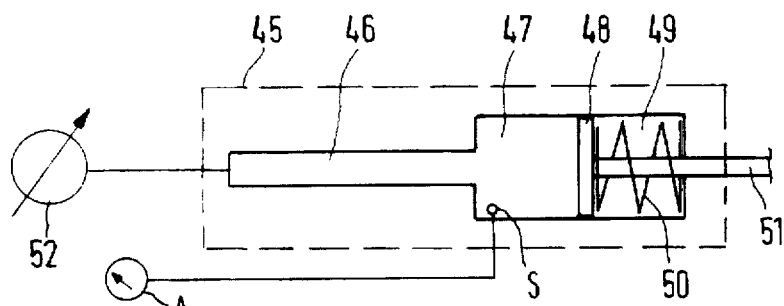
FIG. 4 shows an adjusting element in the form of a volume storage designed with cylinder chamber and pressure equalization cylinder.

FIG. 4 shows an adjusting element 45 in a design which is somewhat different from that of FIG. 3. The adjusting element 45 is provided with a cylinder chamber 47, 49 with a piston 48. The piston 48 is connected, similarly to that of FIG. 3, to a rod 51, to a movable scanning roller (not further shown). The movement of the scanning roller is transmitted via rod 51 to the piston 48. A compression spring 50 is located in the cylinder chamber 49 and exerts a force upon piston 48. A pressure sensor S which is connected to a display device can be provided in the cylinder chamber 47.

The cylinder chamber 47 is connected to a pressure equalization cylinder 46. The pressure equalization cylinder 46 is connected to an adjustable pressure generator 52 and to its connecting circuit.

The adjusting element 45 functions on the principle of the volume storage. The cylinder chamber 47 is sized so that it is able to absorb all the movements of the piston 48. The pressure equalization cylinder 46 represents an additional volume. The pressure equalization cylinder 46 is sized so that the pressure changes produced by the piston 48 become so minimal and insignificant that the pressure prevailing in the cylinder chamber 47 remains essentially constant. This pressure is sensed by sensor S and is displayed by means of the display device A. The pressure equalization cylinder 46 may be a defined length of a connection pipe, for example. The pressure equalization cylinder 46 may however also be a defined length of a stretchable hose. The stretchable hose has the advantage that its length can be kept shorter since its sides can stretch. The adjusting element 45 can be filled with compressed gas, for example, by means of the adjustable pressure generator 52. The display device A displays the current gas pressure in the adjusting element 45 to the operating personnel. Based on calculations or measurements, the pressure in the adjusting element which is needed in order to set a required contact pressure on the movable scanning roller can be ascertained. When this equivalent pressure is reached in the adjusting element 45, the pressure generator 52 is stopped. The desired pressure is maintained in the adjusting element 45.

Figure 5:
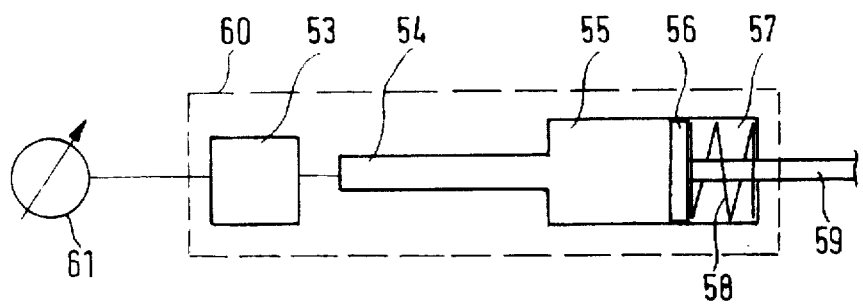
FIG. 5 shows an adjusting element in the form of a volume storage according to FIG. 4, with pressure reduction valve.

FIG. 5 shows an embodiment with further changes. The adjusting element 60 consists of a cylinder chamber 55, 57 with piston 56. Similarly as in the preceding figures, the piston 56 is connected by means of rod 59 to a movable scanning element (not shown). It could for example also be the connection to a scanning element of a sliver funnel. A compression spring 58 is installed in the cylinder chamber 57, exerting a force on the piston 56. The cylinder chamber 55 is connected to a pressure equalization cylinder 54. The pressure equalization cylinder 54 is connected to a pressure reduction valve 53. The cylinder chamber 55 and the pressure equalization cylinder 54 function on the principle of the volume storage. This volume storage is finally connected to a pressure reduction valve 53. The input of the pressure reduction valve 53 is connected to an adjustable pressure generator 61 and to its connection circuit. A desired value for the gas pressure in the volume storage can be set on the pressure reduction valve 53. The pressure generator 61 produces the gas pressure. If the gas pressure in the adjusting element 60 becomes too great, the pressure reduction valve 53 reduces the gas pressure automatically to the set desired value. It is important for the functioning of the pressure reduction valve 53 that a required input pressure is constantly produced and ready by the pressure generator 61.

Figure 6:
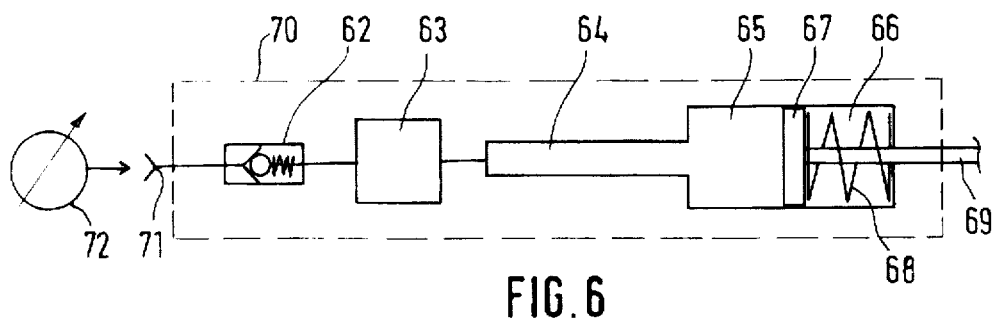
FIG. 6 shows an adjusting element in the form of a volume storage with pressure reduction valve and check valve.

FIG. 6 shows a possible design of an adjusting element 70, whereby a pressure-generator 72 may not only be a stationary pressure generator, but where a mobile pressure generator could also be used. The adjusting element 70 also functions on the principle of the volume storage, whereby a cylinder chamber 65,66 with piston 67 and pressure equalization cylinder 64 are provided. The piston 67 is connected by means of rod 69 to a movable scanning element (not shown). The cylinder chamber 66 contains a compression spring 68 which exerts a force on the piston 67. The pressure equalization cylinder 64 is connected to a pressure reduction valve 63. Furthermore the input of the pressure reduction valve 63 is connected to a check valve 62. The check valve 62 with its connection 71 constitutes the connection to the adjusting element 70.

A mobile pressure generator 72 could for example be connected to the connection 71. The pressure generator 72 may be a compressed-gas generator. Compressed gas would be conveyed through the check valve 62 and the pressure reduction valve 63 into the pressure equalization cylinder 64 and into the cylinder chamber 65. In this process the piston would be moved against the spring 68. The spring 67 presses in that case by means of rod 69 against the movable scanning element. The pressure generator 72 is disconnected from the connection 71 when the desired pressure has been reached in the pressure equalization cylinder 64 and in the cylinder chamber 65. This can be ascertained on the display instrument of the pressure generator 72 or by means of installing a sensor in the cylinder chamber 65 and by means of its connection to a display device. The pressure set in the volume storage corresponds to the desired value set at the pressure reduction valve 63. This pressure on piston 67 is an equivalent of the contact pressure which can be measured on the movable scanning element. This contact pressure on the movable scanning element must remain essentially constant over the entire measuring range of the scanning element. This requirement is met in that the cylinder chamber 65 in the adjusting element 70 and in the equalization cylinder 64 operate on the principle of the volume storage. The check valve 62 makes it possible for the pressure to remain constant at the input of the pressure reduction valve after cutting off the connection to the pressure generator 72. By contrast with FIG. 5, the pressure generator can be disconnected or removed.

Figure 7:
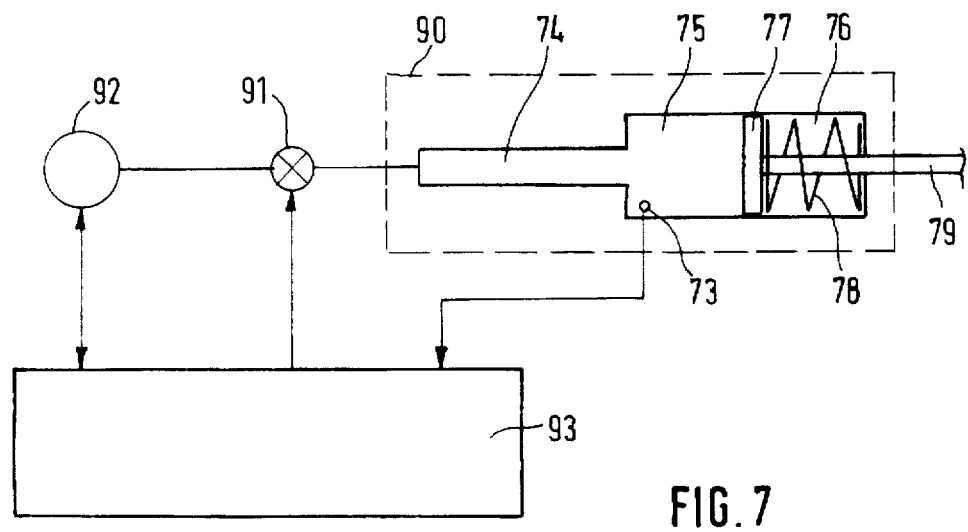
FIG. 7 shows a controllable adjusting element.

FIG. 7 shows a controllable adjusting element 90 in another embodiment. The adjusting element 90 comprises a cylinder chamber 75, 76 with piston 77 and a pressure equalization cylinder 74. As shown earlier, the piston 77 is connected by means of rod 79 to a scanning element. The piston 77 in turn is pre-stressed by means of a spring 78 located in the cylinder chamber 76. The cylinder chamber 75 is connected to the pressure equalization cylinder 74. In the cylinder chamber 75 is a sensor 73 which is connected to controls 93. The pressure equalization cylinder 74 is connected to a control valve 91. The control valve 91 is connected to a pressure generator 92 by a connection circuit. The pressure generator 92 may be a compressed-gas generator for example, and delivers compressed gas into the adjusting element 90. The sensor 73 transmits the current pressure in the adjusting element 90 to the controls 93. When a desired value programmed in the controls 93 has been reached, the controls 93 switches the control valve 91. The desired value programmed in the controls 93 for the pressure is equal to the value which is also an equivalent of the contact pressure to be set on the movable scanning element. As the control valve 91 closes, the desired value of the pressure is maintained in the adjusting element 90. The pressure generator 92 reaches an upper limit value of the pressure at which it stops itself while the control valve is closed.

The embodiment according to FIG. 7 has the advantage that when batches are changed, for example, the adjustment to a different contact pressure can be made by the controls 93. When the controls 93 receive instructions, through manual entry or through a command from a control program, to switch over to a different desired value of the pressure in the adjusting element 90, the controls 93 are able to do so by means of the control valve 91.

If for example a greater pressure is to be set in the adjusting element 90, corresponding to a higher contact pressure of the movable scanning element, the control valve 91 would be switched by means of controls 93 to pass-through direction between pressure generator 92 and adjusting element 90. At the same time the pressure generator would be started up by the controls via the connecting circuit. The pressure generator 92 can increase the pressure in the adjusting element 90 to the applicable desired value. When the sensor 73 transmits the current pressure values in the adjusting element 90 to the controls 93, the latter recognizes when the new applicable desired value is reached. As the new desired value is reached, the control valve 91 is closed. The new desired value for the pressure in the adjusting element 90 is maintained as the control valve 91 closes. The pressure generator 92 switches off automatically, as described earlier.

If on the other hand a lower desired value of the pressure in the adjusting element 90 is required, i.e. a correspondingly lower contact pressure, the control valve can be switched by means of the program of controls 93 to an outflow position, i.e. compressed gas can escape from the adjusting element 90 via the control valve 91 to the outside into the atmosphere. When the sensor 73 senses the corresponding lower value of the pressure, the controls 93 close the control valve 91 and maintains the low desired value of the pressure. The control valve 91 could be made in form of a 3-way valve 100, for example.

Figure 7A:
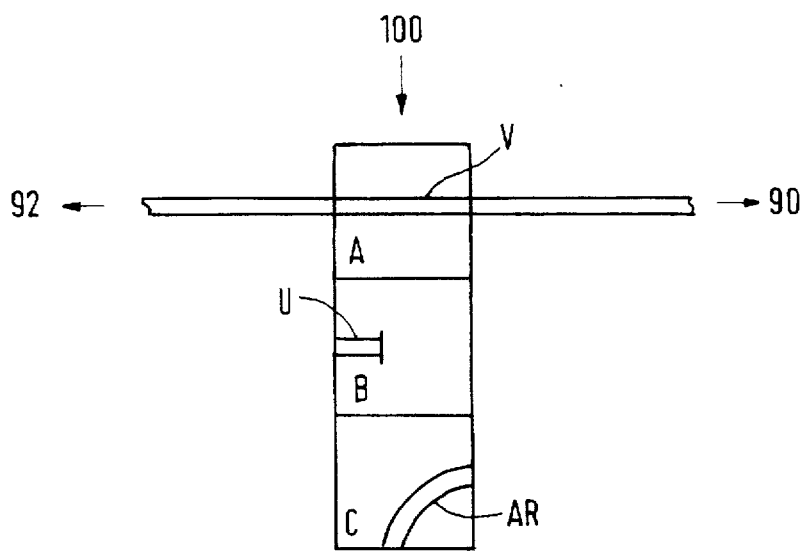
FIG. 7a shows a control valve in the form of a 3-way valve.

FIG. 7a shows a possible embodiment of a 3-way valve 100. Three valve positions can be set. The valve position A relates to the establishment of a connection V between the connecting circuit of the pressure generator 92 and the pipe line to the adjusting element 90, so that compressed gas can be conveyed by the pressure generator 92 into the adjusting element 90. The valve position B relates to the interruption U of said connection, so that no compressed gas can escape from the adjusting element 90. The valve position C relates to the establishment of a connection V between the adjusting element 90, i.e. between the pressure equalization cylinder 74 and an outflow pipe AR. The outlet of the outflow pipe AR goes into the surrounding atmosphere, so that compressed gas is able to escape from the pressure equalization cylinder 74 with cylinder chamber 75 into the atmosphere. In that case the pressure in the adjusting element 90 is reduced. The corresponding valve position A, B or C which is effected on the control valve 91 in the form of a 3-way valve 100 is controlled by controls 93.

Figure 8:
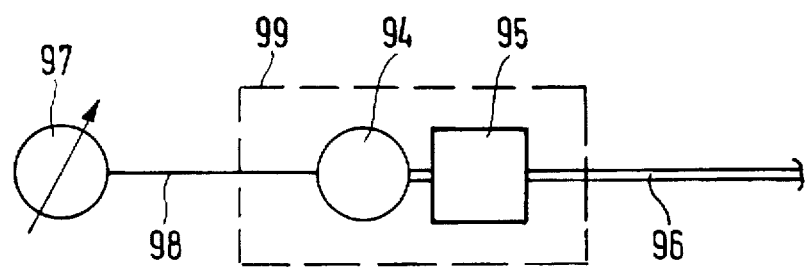
FIG. 8 shows an adjusting element in form of a cyclic magnet.

FIG. 8 shows another embodiment of the invention. The adjusting element 99 is constituted by an electrical cyclic magnet 94 which is integrated with gear 95. Gear 95 is connected by means of force transmission device 96 to a scanning element. The cyclic magnet 94 is connected by means of transmission circuit 98 to a controlled voltage source 97. The cyclic magnet is used to supply a torque at very low rotational speed or when standing still. It is thus possible to produce a constant torque for a fixed measuring range of the scanning device, ensuring a nearly constant contact pressure of the scanning element via the force transmission device 96.

By changing the phase control of the voltage source 97, the rotational speed of the cyclic magnet 94 and thereby its torque can be adjusted to a desired value. The direction of rotation can also be changed. This is useful when the movable scanning element is to be taken away from the fixed sliver guide and into an opening position.

It will be apparent to those skilled in the art that various modifications and variations can be made in the present invention without departing from the scope and spirit of the invention. For example, features illustrated or described as part of one embodiment can be used on another embodiment to yield still a further embodiment. It is intended that the present invention cover such modifications and variations as come within the scope of the appended claims and their equivalents.

We claim:

1. A process for scanning a moving fiber sliver in a textile machine to measure the thickness of the fiber sliver, said process comprising passing the fiber sliver between a fixed element and a movably mounted scanning element and pressing the movably mounted scanning element against the fiber sliver and fixed element so as to have a contact pressure against the fiber sliver, the degree of movement of the movable scanning element indicating changes in thickness of the moving fiber sliver; and, with an adjusting element operatively connected to the movably mounted scanning element and configured to maintain said contact pressure at a substantially constant value, maintaining the contact pressure of the movable scanning element against the fiber sliver substantially constant over substantially the entire measuring range of the movable scanning element so that the measured thickness of the fiber sliver is not affected by changes in the contact pressure of the movable scanning element against the fiber sliver.

2. The process as in claim 1, comprising maintaining the substantially constant contact pressure of the movably mounted scanning element with one of a pneumatic or hydraulic cylinder device used in the adjusting element.

3. The process as in claim 1, comprising maintaining the substantially constant contact pressure of the movably mounted scanning element with a cyclic magnet operatively used in the adjusting element.

4. The process as in claim 1, further comprising varying the substantially constant contact pressure by adjusting the adjusting element.

5. The process as in claim 4, further comprising automatically adjusting the adjusting element by a remotely controlled control valve to maintain a predetermined pressure within a volume storage of the adjusting element.

6. The process as in claim 1, further comprising changing the contact pressure of the movably mounted scanning element when batches of fiber sliver are changed in the textile machine by adjusting the adjusting element.

7. The process as in claim 1, further comprising continuously monitoring the contact pressure of the movably mounted scanning element and adjusting the adjusting element as necessary to maintain a constant contact pressure.

8. The process as in claim 1, further comprising pressing the movably mounted scanning element against the fiber sliver in opposition to a spring mechanism, and moving the movably mounted scanning element to an open position by adjusting the adjusting element and removing the contact pressure of the movably mounted scanning element thereby allowing the spring mechanism to move the scanning element away from the fiber sliver.

9. A device for measuring the thickness of a moving fiber sliver in a textile machine, said device comprising:

a scanning element movably mounted against a fixed element so as to contact a fiber sliver conveyed between said scanning element and said fixed element and move in response to changes in the thickness of the moving fiber sliver, the degree of movement of said scanning element indicating changes in sliver thickness; and an adjusting element operatively connected to said scanning element, said adjusting element applying a pressure to said scanning element so that said scanning element has an applied contact pressure against the fiber sliver, said adjusting element further comprising a constant pressure device configured to maintain a substantially constant said contact pressure on said scanning element so that said contact pressure of said scanning element against the fiber sliver remains substantially constant over an entire scanning range of said scanning element.

10. The device as in claim 9, wherein said adjusting element comprises a fluid medium cylinder chamber having a piston movable within a volume storage, said piston operatively connected to said scanning element.

11. The device as in claim 10, wherein said cylinder chamber is connected to a pressure generator to maintain a fluid medium within said chamber under a predetermined pressure.

12. The device as in claim 10, further comprising a pressure equalization chamber in fluid communication with said chamber.

13. The device as in claim 12, wherein said pressure equalization chamber is connected to a pressure generator.

14. The device as in claim 10, further comprising a spring mechanism disposed within said chamber, said constant pressure device acting on said piston in opposition to said spring mechanism.

15. The device as in claim 9, wherein said adjusting element further comprises a movable piston disposed within a pressurizeable chamber, said piston connected to said scanning element and pressing said scanning element against the fiber sliver with said constant pressure upon pressurization of said chamber, said adjusting element further comprising a pressure equalization chamber in fluid communication with said chamber, said pressure equalization chamber in communication with a pressure reduction valve to maintain a predetermined pressure within said chamber.

16. The device as in claim 15, further comprising a compression spring disposed in said chamber so as to act against said piston so that said piston presses said scanning element in opposition to said spring.

17. The device as in claim 15, wherein a desired pressure within said chamber is set and maintained by said pressure reduction valve.

18. The device as in claim 17, wherein said pressure reduction valve has an input connected to a pressure generator.

19. The device as in claim 17, wherein said pressure reduction valve has an input connected to a check valve.

20. The device as in claim 9, further comprising an automatic control device connected to said adjusting element for automatically maintaining said constant pressure against said scanning element.

21. The device as in claim 20, further comprising a pressure sensing device disposed to sense pressure within said adjusting device and connected to said control device, and a control valve connected to and responding to said control device for controlling pressure within said adjusting element.

22. The device as in claim 9, wherein said adjusting element comprises a cyclic magnet.

23. The device as in claim 22, wherein said cyclic magnet is connected to said scanning element through a gear arrangement.

* * * * *